United States Patent [19]
Dayton

[11] Patent Number: 5,818,349
[45] Date of Patent: Oct. 6, 1998

[54] SWITCH COMPOSED OF IDENTICAL SWITCH MODULES

[75] Inventor: Birney D. Dayton, Nevada City, Calif.

[73] Assignee: NVision, Inc., Grass Valley, Calif.

[21] Appl. No.: 7,060

[22] Filed: Jan. 21, 1993

Related U.S. Application Data

[62] Division of Ser. No. 614,230, Nov. 15, 1990, abandoned.

[51] Int. Cl.$^6$ .................................................. H04Q 1/00
[52] U.S. Cl. ................................. 340/825.79; 340/825.8
[58] Field of Search ..................... 340/825.03, 825.79, 340/825.8, 825.86; 370/65.5, 380; 361/393, 394, 395, 396, 415

[56] References Cited

U.S. PATENT DOCUMENTS

| | | |
|---|---|---|
| 3,317,897 | 5/1967 | Ceonzo et al. . |
| 3,321,745 | 5/1967 | Mansuetto et al. . |
| 3,358,269 | 12/1967 | Bines . |
| 3,399,380 | 8/1968 | Spandorfer . |
| 3,546,390 | 12/1970 | Hackenburg . |
| 3,593,295 | 7/1971 | Joel, Jr. . |
| 3,662,345 | 5/1972 | Shinohara et al. ................. 340/825.89 |
| 3,851,124 | 11/1974 | Garavalia . |
| 3,883,690 | 5/1975 | Kolensky et al. ................. 340/825.06 |
| 4,011,543 | 3/1977 | Soref et al. ......................... 340/825.89 |
| 4,075,608 | 2/1978 | Koenig ................................. 340/825.8 |
| 4,417,245 | 11/1983 | Melas et al. ......................... 340/825.8 |
| 4,495,498 | 1/1985 | Petrelis et al. ...................... 340/825.79 |
| 4,635,250 | 1/1987 | Georgiou ............................... 370/65.5 |
| 4,677,436 | 6/1987 | Burlingame et al. ................ 340/825.8 |
| 4,885,569 | 12/1989 | Lellouche ........................... 340/825.03 |
| 4,929,939 | 5/1990 | Varma et al. ......................... 340/825.8 |
| 4,929,940 | 5/1990 | Franaszek et al. ................... 340/825.8 |
| 5,055,836 | 10/1991 | Kane .................................. 340/825.85 |
| 5,072,217 | 12/1991 | Georgiou ............................ 340/825.79 |

FOREIGN PATENT DOCUMENTS

| | | |
|---|---|---|
| 0387788 | 9/1990 | European Pat. Off. . |
| 0430405 | 6/1991 | European Pat. Off. . |
| 0451999 | 10/1991 | European Pat. Off. ............ 340/825.8 |

OTHER PUBLICATIONS

*Electronics Review*, May 11, 1978 "Branch Exchange Still Relies on Space Division Switch," pp. 39–41.

Primary Examiner—Edwin C. Holloway, III
Attorney, Agent, or Firm—Smith-Hill and Bedell

[57] ABSTRACT

A crosspoint switch having M input terminals and N output terminals has (M/m) times (N/n) crosspoint switch modules each having m input conductors and n output conductors. (M/m) of the crosspoint switch modules have their input conductors connected to the M input terminals respectively of the crosspoint switch, and (N/n) of the modules have their output conductors connected to the N output terminals respectively of the crosspoint switch. The input conductors of the first module are connected to respective input conductors of a second module and the output conductors of the first module are connected to respective output conductors of a third module.

15 Claims, 8 Drawing Sheets

SWITCH COMPOSED OF IDENTICAL SWITCH MODULES

CROSS-REFERENCE TO RELATED APPLICATION

This application is filed as a divisional of patent application Ser. No. 07/614,230, which was filed Nov. 15, 1990 and is now abandoned.

BACKGROUND OF THE INVENTION

This invention relates to a switch composed of identical switch modules.

Figure 1:
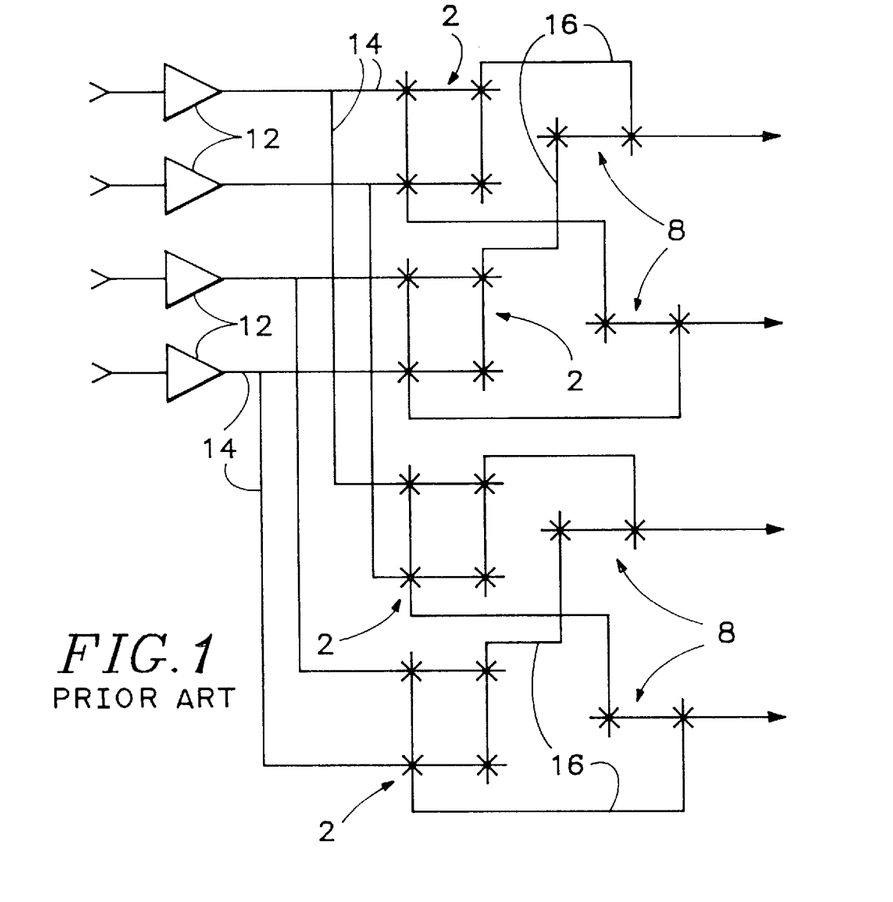
FIG. 1 illustrates in simplified form a 4×4 crosspoint switch of known construction.

Crosspoint switches, i.e., switches having multiple inputs and outputs arranged so that any input can be connected to any output, are widely used in, for example, communication networks. A simple 2×2 crosspoint switch (a switch having two inputs and two outputs) may be constructed of two parallel input conductors, two parallel output conductors crossing the input conductors, and four crosspoint elements at the crossing points of the input and output conductors. The crosspoint elements are operable to select any one or more output conductors for connection to a selected input conductor. In principle, a switch of this nature may have an arbitrarily large number of inputs and an arbitrarily large number of outputs. However, a crosspoint switch of this kind with a large number of inputs, the length of the input conductors depending on the number of outputs and the length of the output conductors depending on the number of inputs, is not well suited for use with very high frequency signals because the portion of the selected output conductor on the opposite side of a selected crosspoint element from the output constitutes a stub, whose length depends on the input conductor that is selected, and if the stub is long the signal propagated to the output is degraded. Moreover, this technique for building a large crosspoint switch does not lend itself well to use of modular construction techniques, except at the level of a single crosspoint element. Consequently, most crosspoint switches are constructed in two or more stages, each stage being formed of multiple identical modules. FIG. 1 of the accompanying drawings shows a 4×4 crosspoint switch composed of four 2×2 primary modules 2 and four 2×1 secondary modules 8. As shown, each input to the 4×4 crosspoint switch must be provided with a fanout amplifier 12 that is able to drive the input conductors of two primary modules. Further, eight fanout conductors 14 are needed to connect the fanout amplifiers to the primary modules and eight secondary conductors 15 are needed to connect the primary modules to the secondary modules.

At the level of the 4×4 crosspoint switch, the need to drive multiple primary modules and provide transmission lines to connect the primary modules and the secondary modules does not give rise to major problems. However, with a large crosspoint switch, for example a 512×512 switch based on (256) 64×16 primary modules and (512) 8×1 secondary modules, each input must be provided with a fanout amplifier able to drive the input conductors of 32 primary modules, and there must be 16,384 cables connecting the fanout amplifiers to the primary modules and 4,096 cables connecting the primary modules to the secondary modules. It is self-evident that a switch of this complexity is very expensive to build and is very large.

A routing switcher having, for example, 1,024 input terminals and 1,024 output terminals can be implemented using a crosspoint switch having fewer than 1,024 inputs and 1,024 outputs by use of time division multiplexing techniques. The input signals, which may, for example, be audio, video or data, are converted to digital form and applied to a multiplexer, which allocates time slots to its terminals. The multiplexer has output terminals that are connected to respective input terminals of a crosspoint switch, whose output terminals are connected to a demultiplexer that is synchronized with the multiplexer and has output terminals connected to respective digital to analog converters. If the operator wishes a particular input terminal of the switcher to be connected to a particular set of output terminals of the switcher (which set may have only one element) a controller issues a crosspoint select signal that causes particular crosspoint elements of the crosspoint switch to become conductive during the time slot that is allocated to the desired input terminal and the demultiplexer receives the input signal and applies it to the appropriate set of output terminals. The DAC converts the digital signal provided by the demultiplexer to analog form. In such a switcher, the bandwidth of the crosspoint switch depends not only on the bandwidth of the input signals, but also on the relationship between the number of input signals and the number of input terminals to the crosspoint switch and the number of bits to which the input signals are digitized. It will therefore be seen that signals of much higher bandwidth than the input signals are propagated through the crosspoint switch.

SUMMARY OF THE INVENTION

In accordance with a first aspect of the invention, a crosspoint switch having M input terminals and N output terminals comprises (M/m) times (N/n) crosspoint switch modules each having m input conductors and n output conductors. (M/m) of the modules have their input conductors connected to the M input terminals respectively of the crosspoint switch and (N/n) of the modules have their output conductors connected to the N output terminals respectively of the crosspoint switch. The input conductors of the first module are connected to respective input conductors of a second module and the output conductors of the first module are connected to respective output conductors of a third module.

In accordance with a second aspect of the invention, a crosspoint switch module comprises m input conductors, n output conductors, m×n crosspoint elements operable selectively for connecting any selected input conductor to at least one selected output conductor, n input expansion conductors, and n input expansion crosspoint elements for connecting the input expansion conductors to the output conductors respectively.

BRIEF DESCRIPTION OF THE DRAWINGS

For a better understanding of the invention, and to show how the same may be carried into effect, further reference will be made, by way of example, to the accompanying drawings in which.

In the several figures, like reference numerals designate identical or corresponding components.

DETAILED DESCRIPTION

Figure 2:
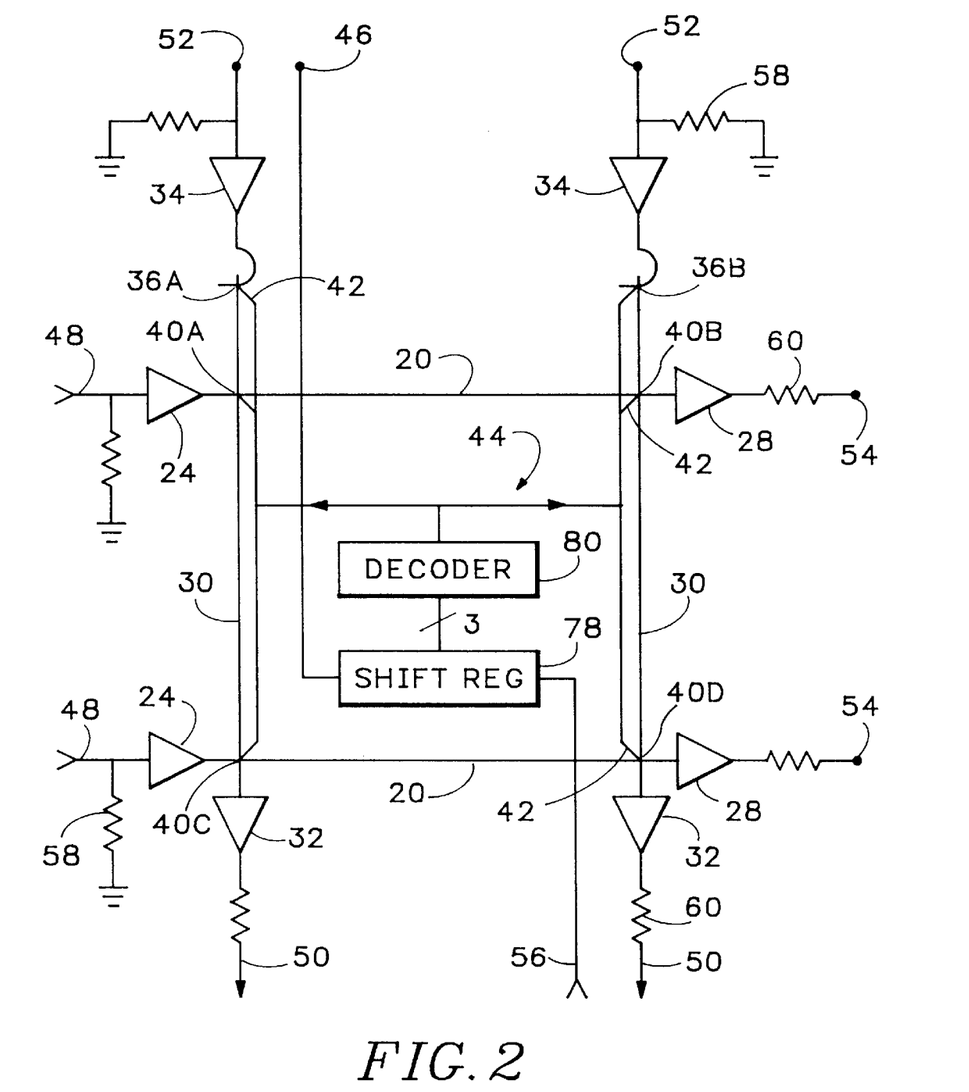
FIG. 2 illustrates schematically a 2×2 crosspoint module embodying the present invention.

The 2×2 switch module shown in FIG. 2 comprises two input conductors 20, having input buffers 24 at one end and output expansion buffers 28 at the opposite end, and two output conductors 30. Each output conductor 30 traverses the two input conductors, and two primary crosspoint elements 40 are provided for connecting the output conductor selectively to one or the other of the input conductors. Each output conductor has an output buffer 32 at one end and is connectable at its opposite end by an input expansion crosspoint element 36 to an input expansion buffer 34. Each crosspoint element has a control terminal 42 for receiving a control signal that places the crosspoint element either in the conductive state or the non-conductive state. Control terminals 42 are connected to respective outputs of a crosspoint selector 44.

The switch module illustrated in FIG. 2 has two signal in terminals 48 connected to the inputs of buffers 24, two signal out terminals 50 connected to the outputs of buffers 32, two input expansion terminals 52 connected to the inputs of buffers 34, two output expansion terminals 54 connected to the outputs of buffers 28, a crosspoint control input terminal 56 connected to the input of crosspoint selector 44 and a crosspoint control output terminal 46 connected to the output of crosspoint selector 44. Destination termination resistors 58 are connected between the inputs of buffers 24, 34 and ground, and source termination resistors 60 are connected between the outputs of buffers 28, 32 and terminals 54, 50, respectively. Buffers 24, 28, 32 and 34 have sufficient gain to compensate for loss in the termination resistors.

The module shown in FIG. 2 may be implemented in a single monolithic integrated circuit chip by use of conventional photolithographic techniques. The chip has power and ground terminals (not shown), for supplying operating current for the buffers 24, 28, 32 and 34, in addition to the terminals discussed above. A 2×2 module has been described by way of example only, and in order to make full use of current technology a module based on the principles described with reference to FIG. 2 would normally have more than two inputs and more than two outputs. For example, a module having sixteen signal in terminals and sixteen signal out terminals could be fabricated on a single monolithic integrated circuit chip using photolithographic technology that is currently available.

Figure 3:
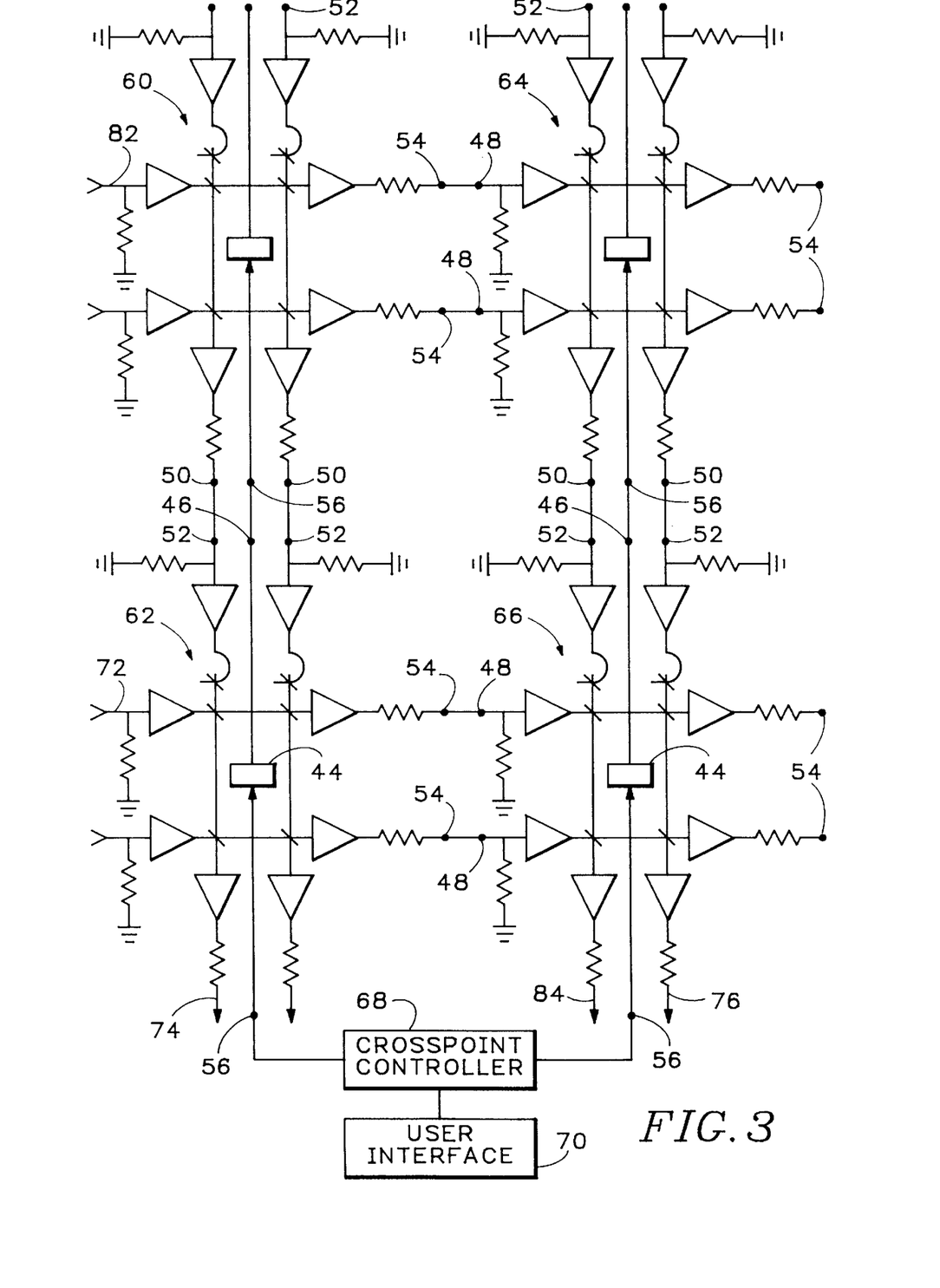
FIG. 3 illustrates in somewhat simplified form a 4×4 crosspoint switch based on the module shown in FIG. 2.

FIG. 3 shows a 4×4 switch that comprises four 2×2 switch modules 60–66 and a crosspoint controller 68. The signal out terminals 50 of modules 60 and 64 are connected to the input expansion terminals 52 of modules 62 and 66 by respective transmission lines that are terminated at source and destination, and the output expansion terminals 54 of modules 60 and 62 are connected to the signal in terminals 48 of modules 64 and 66 by respective transmission lines that are terminated at source and destination. The input expansion terminals 52 of modules 60 and 64 are unused, as are the output expansion terminals 54 of modules 64 and 66. By use of transmission lines to connect the various modules and the source and destination terminations that are included in the modules, a favorable environment for transmission of high frequency signals is provided.

Crosspoint controller 68 has outputs connected to the crosspoint control input terminals 56 of modules 62 and 66, the crosspoint control output terminals 46 of these modules being connected to the crosspoint control input terminals of modules 60 and 64 respectively.

Crosspoint controller 68 receives a command indicating that a particular signal in terminal, for example terminal 72 shown in FIG. 3, is to be connected to a subset of signal out terminals, for example the subset composed of terminals 74 and 76. The command might ultimately originate from a user interface 70, at which a user operates controls indicating that an input signal provided by a source connected to terminal 72 should be distributed to devices that are connected to terminals 74 and 76. Crosspoint controller 68 generates two serial control words, which it applies to the crosspoint control input terminals 56 of modules 62 and 66 respectively. As shown in FIG. 2, the crosspoint selector 44 connected to each terminal 56 may be composed of a shift register 78 and a decoder 80. Each control word is composed of six data bits and appropriate control bits. The first group of three data bits of the control word applied to the terminal 56 of module 62 is transmitted through shift register 78 of module 62 and is loaded into shift register 78 of module 60, and the second group of three data bits is loaded into shift register 78 of module 62. Alternatively, each crosspoint selector might accept all data bits of the control word and decode only those that relate to the crosspoint elements of that module. Yet again, the command might include, associated with each control word, an address word that identifies a unique module so that a particular control word is loaded only into the crosspoint selector identified by the corresponding address word. In either case, a three-bit data word is used to control the states of the crosspoint elements 36 and 40 of module 62.

The crosspoint selector 44 of module 62 decodes the three-bit data word into two three-component vectors, associated respectively with the two output conductors of module 62. The vector associated with the output conductor connected to terminal 74 has the components {0,1,0}, indicating that crosspoint element 40A should be conductive and crosspoint elements 36A and 40C should be non-conductive, and the vector associated with the signal out terminal of module 62 has the components {X,0,X} (where X designates don't care), indicating that crosspoint element 40B of module 62 should be non-conductive.

The crosspoint selector of module 66 generates the vectors {X,0,X} and {0,1,0} so that crosspoint elements 36B, 40A and 40D are non-conductive and crosspoint element 40B is conductive. In this fashion, the input signal applied to the input 72 is isolated from modules 60 and 64. If, on the other hand, crosspoint controller 68 received a command that the signal in terminal 82 should be connected to the signal out terminal 84, the crosspoint selector of module 60 would generate the vectors {X,X,0} and {X,X,0}, so that crosspoint elements 40C and 40D were non-conductive, the crosspoint selector of module 62 would generate the vectors {X,X,X} and {X,X,X}, while the crosspoint selector of module 64 would generate the vectors {0,0,1} and {X,X,0}, which render only the primary crosspoint element 40D of that module conductive and the crosspoint elements 36A, 40A and 40C non-conductive, and the crosspoint selector of module 66 would generate the vectors {1,0,0} and {X,X,X}, which render the input expansion crosspoint element 36A conductive and the primary crosspoint elements 40A and 40D non-conductive. In this fashion, a signal provided at a signal in terminal of module 60 can be propagated to any set of signal out terminals, including a single output terminal, through module 62 or 66, but a signal at one of the signal in terminals of module 62 is isolated from modules 60 and 64 by virtue of the input expansion crosspoint elements 36 of modules 62 and 66 being non-conductive. In either case, the maximum length of a stub portion of an output conductor is sufficiently small that it does not degrade the signal being propagated through the switch.

A crosspoint switch module based on the principles described with reference to FIG. 2 allows a crosspoint switch to be constructed with an arbitrarily large number of inputs and an arbitrarily large number of outputs without the complication of the two stage design described with reference to FIG. 1. The modules are functionally arranged in a simple rectangular array, and the buffers of a module each need drive no more than one input or output conductor of one adjacent module. Each module is connected only to the module(s) that is(are) adjacent it in the array. The number of interconnect conductors is therefore much less than in the case of the switch described with reference to FIG. 1. The number of crosspoint elements in an M×N switch composed of m×n modules, where m and n are integer submultiples of M and N respectively, is (M×N)*(m+1)/m.

Figure 4:
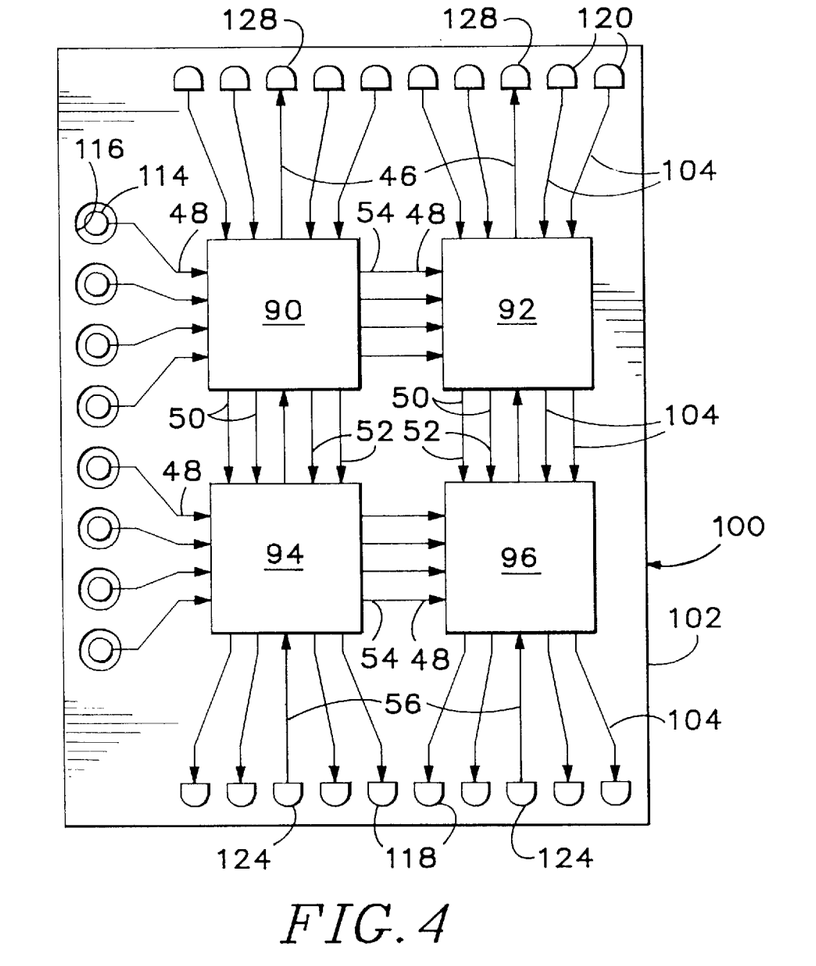
FIG. 4 is a plan view of a circuit board comprising a substrate and an 8×8 crosspoint switch based on 4×4 crosspoint modules.

FIG. 4 shows schematically an 8×8 switch that comprises four 4×4 switch modules 90–96 arranged in a 2×2 array. The signal out terminals 50 of modules 90 and 92 are connected to the input expansion terminals 52 of modules 94 and 96. The signal in terminals 48 of modules 92 and 96 are connected to the output expansion terminals 54 of modules 90 and 94 respectively. The output expansion terminals of modules 92 and 96 are unused. The crosspoint controller of the FIG. 4 switch is not shown.

The switch modules 90–96 are mounted on a circuit board 100 comprising a substrate 102 and conductor runs 104 connected to the terminals of the modules. The signal in terminals 48 of modules 90 and 94 are connected through respective conductor runs to optical repeaters 114, which are aligned with openings 116 in the substrate. Each optical repeater comprises an infrared optical receiver, such as a photodiode, and an optical emitter, such as an LED or laser diode. When optical radiation is incident on the optical receiver, the repeater applies an electrical signal to its associated conductor run and also energizes the optical emitter so that it emits an optical signal. The signal out terminals 50 of modules 94 and 96 are connected through conductor runs to respective infrared optical emitters 118. The input expansion terminals of modules 90 and 92 are connected to respective infrared optical receivers 120. The crosspoint control input terminals 56 of modules 94 and 96 are connected to respective infrared optical receivers 124, and the crosspoint control output terminals 46 of modules 90 and 92 are connected to respective infrared optical emitters 128.

Figure 5:
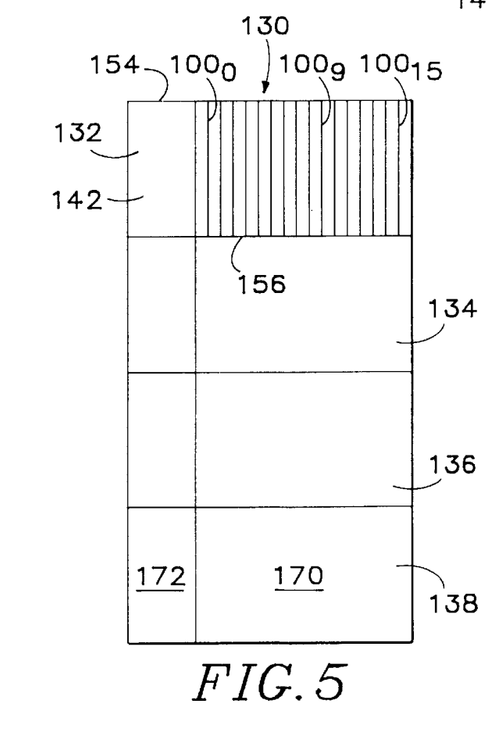
FIG. 5 is a front elevation of a distribution switcher including multiple circuit boards of the kind shown in FIG. 4.

FIG. 5 illustrates an audio signal distribution switcher comprising a frame 130 that is divided into four compartments 132–138. The upper three compartments 132–136 each contain an input transducer module 142 and sixteen circuit boards $100_i$ (i=0 . . . 15) of the form shown in FIG. 4.

Figure 6:
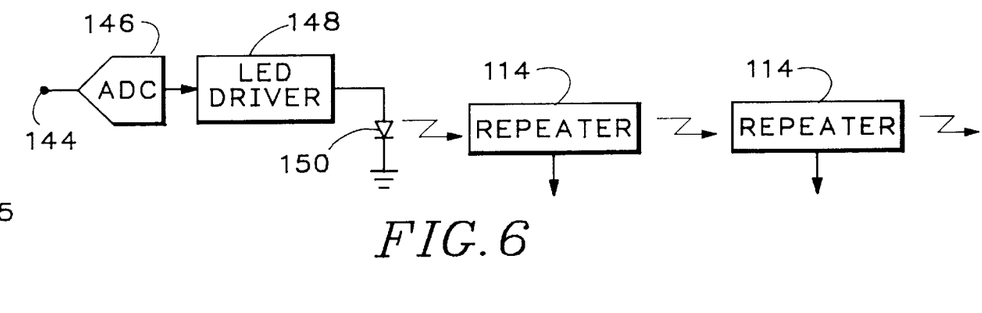
FIG. 6 is a block diagram of one channel of an input transducer module of the switcher.

The input transducer module 142 has eight channels each with an input terminal 144 (FIG. 6) for receiving an analog electrical signal at audio frequencies. The analog audio input signal is digitized and encoded into serial data words by an analog-to-digital converter (ADC) 146 and the serial data words are applied to an LED driver 148 for driving an infrared emitter 150, such as an LED or laser diode. Each emitter 150 emits an optical signal in serial digital form representative of the analog audio signal received at the corresponding input terminal.

Figure 7:
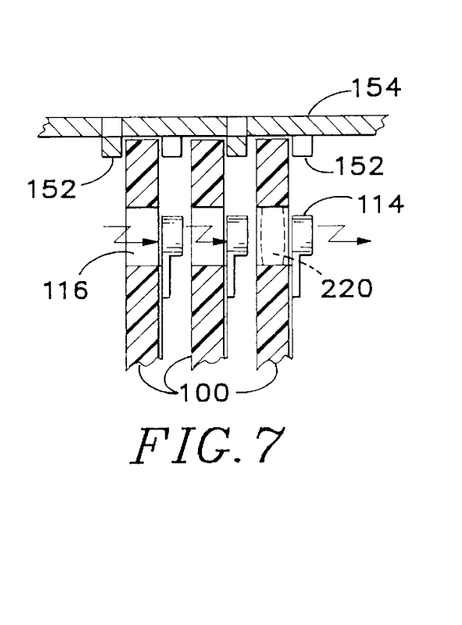
FIGS. 7 and 8 illustrate details of the manner in which the circuit boards are mounted in the switcher.
Figure 8:
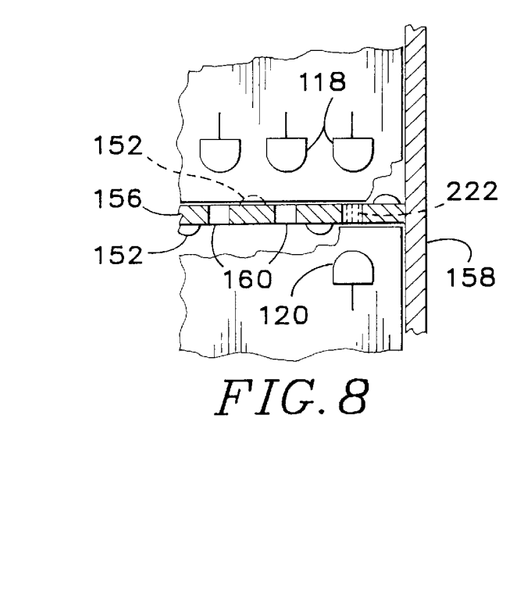

As shown in FIGS. 7 and 8, the circuit boards $100_i$ are received in slots defined between pressed-out formations 152 of top and bottom plates 154, 156 that bound the compartment 132, for example, and engage a back plate 158. The emitters 118 and receivers 124 of each board in compartments 132–136 are disposed vertically above respective receivers and emitters in the compartment immediately below. The plates that separate compartments 132–138 from each other are formed with holes 160 that are positioned relative to the back plate 158 so that an optical signal from an emitter 118 of a board $100_i$ in compartment 132, for example, is received by the corresponding receiver 120 of the corresponding board in compartment 134.

Each repeater 114 on each board in compartment 132 lies in a linear array containing one repeater of each other board in that compartment. Each emitter 150 of the input transducer module 142 is aligned with one of the rows of sixteen repeaters 114. Therefore, the optical signal received by a repeater 114 of the board $100_0$ from an emitter 150 of the input module generates an electrical signal that is applied to the corresponding conductor run of the board $100_0$ and also is repeated to provide an optical signal that is applied to the corresponding optical repeater of the board $100_1$. In this fashion, each input terminal of the transducer module 142 is coupled to a signal input terminal of each of the sixteen circuit boards.

Figure 10:
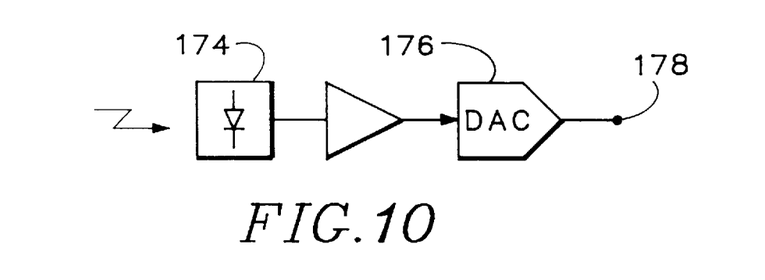
FIG. 10 is a block diagram of an output data channel of the switcher.

The bottom compartment 138 of frame 130 contains a transducer module 170 and a crosspoint controller 172. The transducer module 170 has 123 data channels, each of which comprises an infrared receiver 174 (FIG. 10). The 128 receivers are arranged in a rectangular array for receiving light emitted by the emitters 118 of the circuit boards in compartment 136. Each receiver provides an encoded electrical signal to a digital-to-analog converter (DAC) 176. DAC 176 generates an analog electrical output signal representative of the digital optical signal received by the receiver. The outputs of the DACs are connected to respective output terminals 178 of the switcher.

Figure 9:
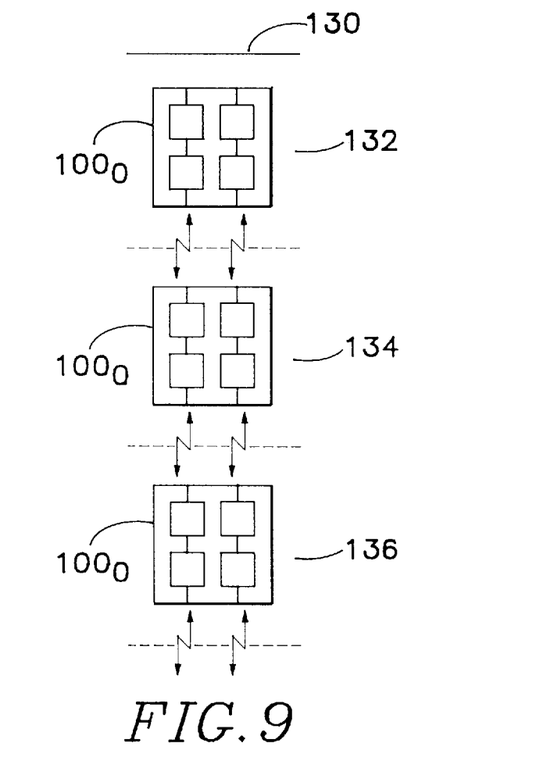
FIG. 9 illustrates schematically the arrangement of three of the circuit boards of the switcher.

Considering, for example, the circuit boards $100_0$ of compartments 132–136, it can be seen, as shown in FIG. 9, that the crosspoint switch modules are arranged in two columns each containing six crosspoint switch modules. Since there are sixteen circuit boards in each compartment, there are 32 columns of crosspoint switch modules. The transducer module 170 has 32 control channels, associated respectively with the columns of crosspoint switch modules. Each control channel has an input terminal 180 connected to the crosspoint controller for receiving a data word from the crosspoint controller 172, an LED driver 182 and an infrared optical emitter 184, such as an LED or laser diode.

Figure 11:
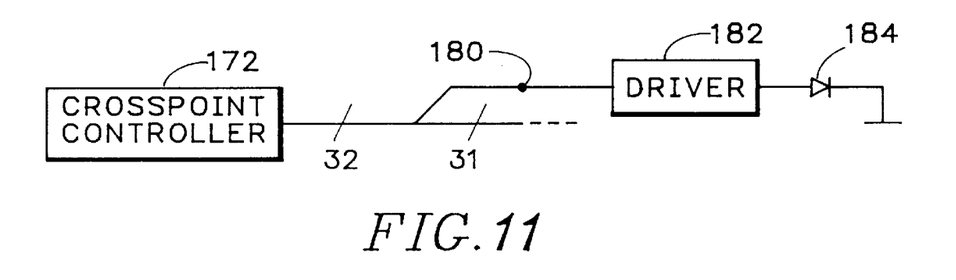
FIG. 11 is a block diagram of a control channel of the switcher.

A user interface (not shown) generates a command that identifies an input terminal of the switcher and a set of output terminals. In response to this command, crosspoint controller 172 generates up to 32 serial data words. The 32 data words define the states of the crosspoint elements in the 32 columns of crosspoint modules that should be established in order to connect the selected set of output terminals to the specified input terminal of the switcher. The serial data words are encoded into electrical signals, which are applied to optical emitters 184 respectively. The optical emitters convert the electrical signals to optical form. Each optical emitter 184 of the transducer module 170 is aligned with a receiver 124 of a board in compartment 136. Thus, the crosspoint control signal emitted by an emitter 184 of the transducer module 170 is applied to a selected optical receiver 124 of a unique board in compartment 136.

It will therefore be seen that the circuit boards of the FIG. 5 switcher communicate with one another and with the transducer modules by use of free space optics, i.e. by propagation of light in free space rather than in a guided medium, such as an optical fiber.

Each crosspoint switch module has twenty crosspoint elements, and therefore a five-bit data word is needed in order to generate a vector for controlling all crosspoint elements independently of each other. Each column of crosspoint switch modules contains six modules, and so each of the 32 crosspoint control words may be composed of 30 data bits. The appropriate data bits are loaded into the respective crosspoint selectors and control the states of the primary crosspoints and input expansion crosspoints of the module. The number of bits actually required may be reduced below 30 by use of a decoding scheme that takes account of the fact that if the input expansion crosspoint element associated with a particular output conductor of a crosspoint switch module is conductive, none of the primary crosspoint elements on that conductor should be conductive.

It can readily be seen that the switcher described with reference to FIGS. 5–11 can be expanded to accommodate additional inputs simply by adding one or more compartments similar to compartments 132–136. The input transducer module of each additional compartment is independent of the other input transducer modules, and the circuit boards of the additional compartment(s) are coupled to the circuit boards of the existing compartments without any need for wiring, other than for power supplies for operating the devices mounted on the circuit boards. A switcher able to accommodate additional outputs can be constructed by including additional circuit boards in each compartment. Increasing the number of outputs necessitates modification of transducer module 170 and crosspoint controller 172.

Figure 12:
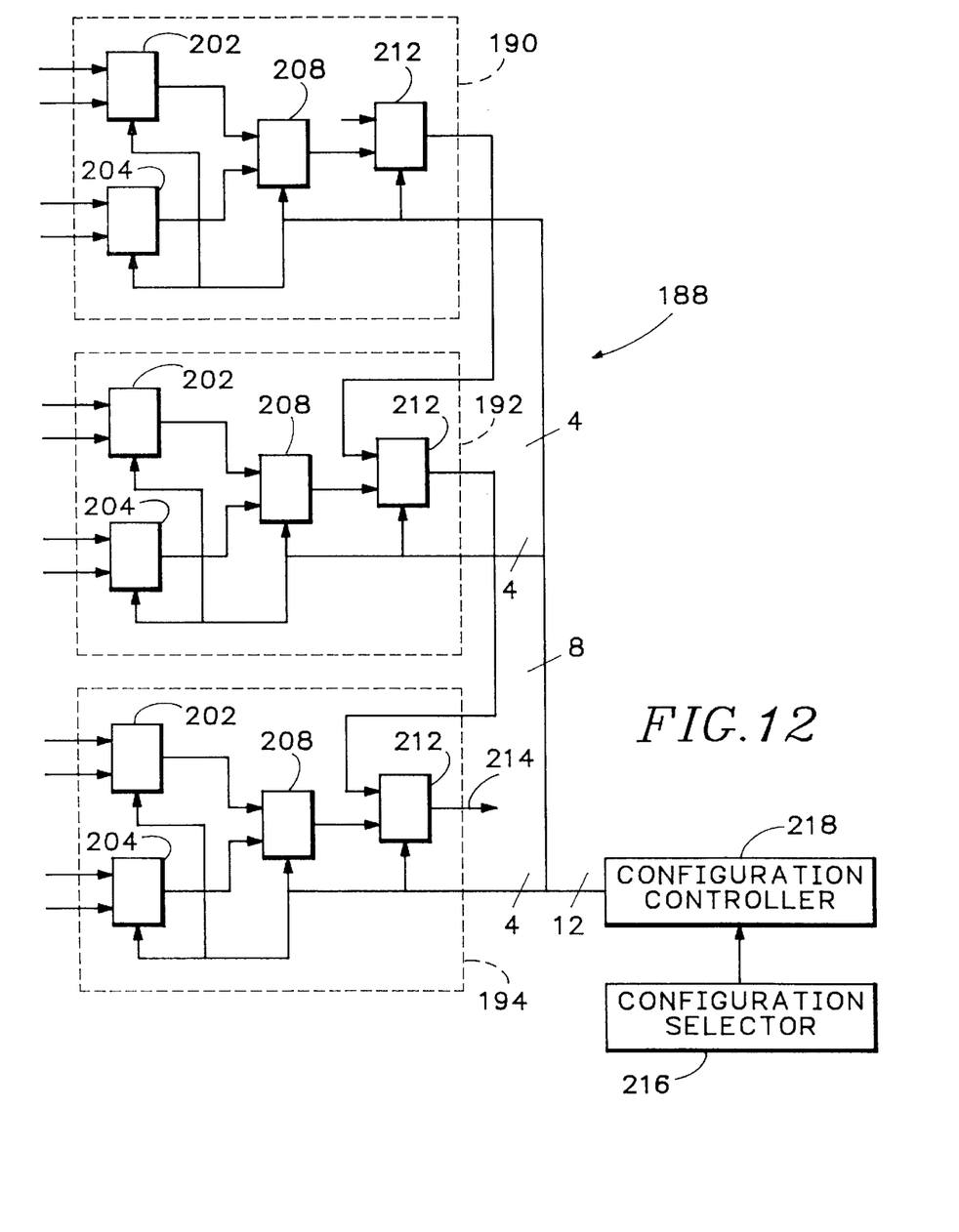
FIG. 12 is a block diagram of a switch based on multiplexers.

FIG. 12 illustrates a 12×1 switch 188 based on 2×1 multiplexers. The switch is composed of three 4×1 switch modules 190, 192 and 194. Module 192, for example, comprises two first stage multiplexers 202 and 204, which receive the four inputs of the module, a second stage multiplexer 208, whose inputs are connected to the outputs of the multiplexers 202 and 204 respectively, and an input expansion multiplexer 212, which receives at a first input the output of second stage multiplexer 208 and at a second input the output of the input expansion signal multiplexer of module 190. The output of multiplexer 212 of module 192 constitutes the output of the module and is connected to the second input of the input expansion multiplexer 212 of module 194, the output 214 of which is the output of the switch. Each multiplexer selects one of its two inputs in dependence upon the state of a control bit. Multiplexer 212 of module 190 always selects the first input, since its second input is not connected to another module. Accordingly, the module shown in FIG. 12 is able to connect its four signal inputs selectively to its signal output. The module also comprises a configuration selector 216, which provides a four-bit configuration control word to a configuration controller 218. The controller 218 decodes the control word into three four-bit vectors, the components of which constitute the control bits for multiplexers 202–212.

Figure 13:
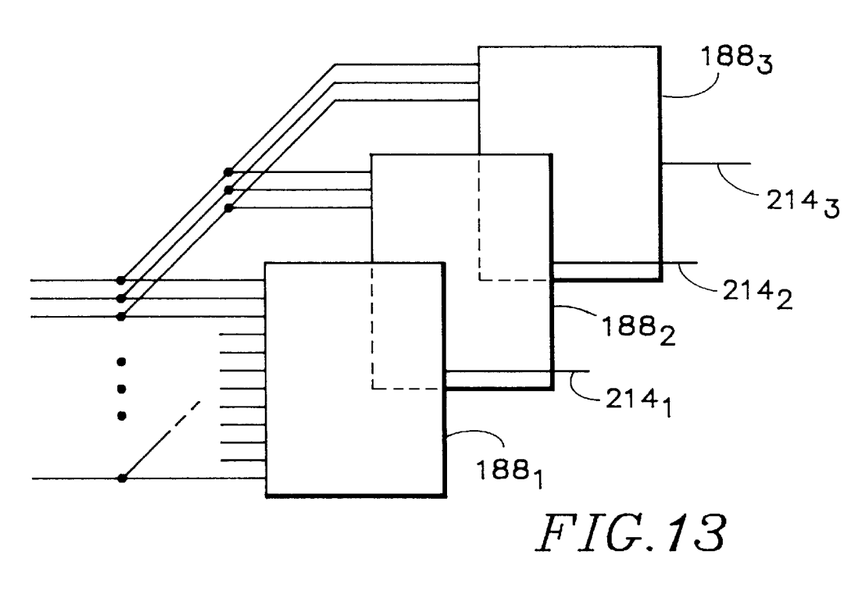
FIG. 13 is a schematic perspective view of an enlarged switch based on multiplexers.

The modules shown in FIG. 12 implement a 12×1 switch. Output expansion is provided by identical modules having corresponding input terminals connected together, as described with reference to FIGS. 4–10 and as shown in FIG. 13.

It will be appreciated that the invention is not restricted to the particular embodiments that have been described, and that variations may be made therein without departing from the scope of the invention as defined in the appended claims and equivalents thereof. For example, the invention is not limited to the switch module operating with electrical signals, since by use of integrated optic techniques a module for routing optical signals may be fabricated by employing an optical directional coupler for each switch element, in which case a switcher similar to that shown in FIGS. 5–10 may be constructed in which it is not necessary to convert the optical signals provided by the input transducer module 142 to electrical form before reaching the transducer module 170. Of course, in the case in which optical directional couplers are used as the switch elements, electrical signals are nevertheless required for control purposes. Use of free space optics for board-to board communication does not exclude the possibility of employing lenses or light guides to limit diffusion of light. For example, as shown in FIGS. 7 and 8, a lens 220 or light guide 222 may be mounted in the hole 116 or 160, and communication between repeaters 114 or from emitter 118 to receiver 120 would still employ free space optics. Although it is preferred that free space optics be used for board-to-board communication in a switcher having the architecture described with reference to FIG. 9, it would also be possible to use electrical connectors, such as zero insertion force (ZIF) connectors, for interconnecting the boards. The invention is not limited to a switch in which the number of inputs or outputs is equal to an integer multiple of the number of inputs or outputs of a module, since a 15×15 switch, for example, may be constructed either using a 4×4 array of 4×4 modules leaving one input and one output unused or using a 3×3 array of 4×4 modules plus three 4×3 modules, three 3×4 modules and one 3×3 module. Such a switch may be conceived of as a 12×12 switch plus an 8×3 switch, a 3×8 switch and a 3×3 switch.

In the case of the module described with reference to FIG. 11, each multiplexer would normally have more than two inputs. Multiplexers having four inputs are commercially available and would allow construction of a 16×1 switch module with four first stage multiplexers and two second stage multiplexers. The input expansion multiplexer only needs to be a 2×1 multiplexer.

I claim:

1. A crosspoint switch having M input terminals and N output terminals and comprising (M/m) times (N/n) crosspoint switch modules each having m input conductors, n output conductors, means operable selectively for interconnecting any one of the m input conductors and any selected set of the n output conductors, n input expansion conductors, and n input expansion crosspoint elements operable selectively to connect the n input expansion conductors to the n output conductors respectively, (M/m) of the modules having their input conductors connected to the M input terminals respectively of the crosspoint switch, (N/n) of the modules having their output conductors connected to the N output terminals respectively of the crosspoint switch, the input conductors of the first module being connected to respective input conductors of a second module and the output conductors of the first module being connected to respective input expansion conductors of a third module.

2. A crosspoint switch according to claim 1, wherein each switch module comprises m×n crosspoint elements operable selectively for interconnecting any combination composed of one input conductor and any set of output conductors.

3. A crosspoint switch according to claim 1, wherein each of the n output conductors has first and second opposite ends and each input expansion crosspoint element is disposed at the first end of an output conductor, and wherein the third module comprises n output buffers connected to its output conductors respectively at said second end thereof and n input expansion buffers connected to its input expansion conductors respectively, the input expansion buffers having input terminals connected to respective output terminals of the first module.

4. A crosspoint switch according to claim 1, wherein each of the input conductors has first and second opposite ends and each of the first and second modules includes m input buffers connected to its input conductors respectively at said first end thereof, the first module includes m output expansion buffers connected to its input conductors respectively at said second end thereof, and the output expansion buffers of the first module have respective outputs connected to respective inputs of the input buffers of the second module.

5. A crosspoint switch according to claim 1, wherein each of the output conductors has first and second opposite ends and each input expansion crosspoint element is disposed at the first end of an output conductor, and wherein each module comprises n output buffers connected to its output conductors respectively at said second end thereof and n input expansion buffers connected to its input expansion conductors respectively, the output buffers of the first module having output terminals connected to the input terminals of respective input expansion buffers of the third module.

6. A crosspoint switch according to claim 1, wherein each input conductor of each switch module has first and second ends and is connected at its first end to a signal in terminal of the switch module and at its second end to an output expansion terminal of the switch module, and each switch module comprises n matrix crosspoint elements distributed along each input conductor and each operable to connect the input conductor to any set of output conductors of the switch module.

7. A crosspoint switch according to claim 1, comprising a fourth crosspoint switch module having its input conductors connected to respective input conductors of the third module and its input expansion conductors connected to respective output conductors of the second module.

8. A crosspoint switch according to claim 7, wherein each input conductor of each switch module has first and second opposite ends and is connected at its first end to a signal in terminal of the switch module and at its second end to an output expansion terminal of the switch module, each output conductor has first and second opposite ends, each input expansion crosspoint element is at the first end of an output conductor, there is a signal out terminal of the switch module at the second end of each output conductor, and each switch module comprises m matrix crosspoint elements distributed along each output conductor and each operable selectively to connect one input conductor to the output conductor.

9. A crosspoint switch according to claim 7, wherein the third module comprises m input buffers connected to its input conductors respectively at a first end thereof and m output expansion buffers connected to its input conductors respectively at a second end thereof, the second module has n output buffers connected to its output conductors respectively at a first end thereof, and the fourth module has m input buffers connected to its input conductors at a first end thereof and n input expansion buffers connected to its n input expansion conductors respectively, and wherein the m output expansion buffers of the third module are connected to the m input buffers respectively of the fourth module and the n output buffers of the second module are connected to the n input expansion buffers respectively of the fourth module.

10. A crosspoint switch module comprising:
   m input conductors each having first and second opposite ends,
   m input buffers connected to the input conductors respectively at the first end thereof,
   m output expansion buffers connected to the input conductors respectively at the second end thereof,
   n output conductors,
   m×n crosspoint elements operable selectively for connecting any selected input conductor to any selected set of output conductors,
   n input expansion conductors, and
   n input expansion crosspoint elements for connecting the input expansion conductors to the output conductors respectively.

11. A crosspoint switch module according to claim 10, wherein each of the output conductors has first and second opposite ends and the n input expansion crosspoint elements are at the first ends respectively of the output conductors, and the module comprises n output buffers connected to the output conductors respectively at the second end thereof and n input expansion buffers connected to the input expansion conductors respectively.

12. A crosspoint switch module comprising:
   m input conductors,
   n output conductors each having first and second opposite ends,
   n output buffers connected to the output conductors respectively at the second end thereof,
   m×n crosspoint elements operable selectively for connecting any selected input conductor to any selected set of output conductors,
   n input expansion conductors,
   n input expansion buffers connected to the input expansion conductors respectively, and
   n input expansion crosspoint elements for connecting the input expansion conductors to the output conductors respectively, the n input expansion crosspoint elements being at the first ends respectively of the output conductors.

13. A crosspoint switch having M input terminals and N output terminals and comprising (M/m) times (N/n) crosspoint switch modules each having m signal in terminals and n signal out terminals, (M/m) of the modules having their signal in terminals connected to the M input terminals respectively of the crosspoint switch, (N/n) of the modules having their signal out terminals connected to the N output terminals respectively of the crosspoint switch, and wherein the first module has m output expansion terminals that are connected to respective signal in terminals of a second module and a third module has n input expansion terminals connected to respective signal out terminals of the first module, and the third module also comprises n switch elements operative selectively to connect the input expansion terminals of the third module to respective signal out terminals thereof.

14. A crosspoint switch according to claim 13, wherein the third module comprises m input conductors each having first and second opposite ends and each connected at its first end to a signal in terminal of the third module and at its second end to an output expansion terminal of the third module, n output conductors each having first and second opposite ends, m primary crosspoint elements distributed along each output conductor and each operable selectively to connect one input conductor to the output conductor, and wherein there is an input expansion terminal of the third module at the first end of each output conductor and a signal out terminal of the third module at the second end of each output conductor.

15. A crosspoint switch according to claim 13, wherein each switch module comprises n matrix crosspoint elements distributed along each input conductor and operable selectively to connect the input conductor to any set of output conductors of the module.

\* \* \* \* \*